United States Patent [19]
De Soete et al.

[11] Patent Number: 5,348,716
[45] Date of Patent: Sep. 20, 1994

[54] PROCESS FOR PURIFYING A GAS CONTAINING NITRIC OXIDE

[75] Inventors: Gérard De Soete, Colombes; Léon Ninane, Dombasle-Sur-Meurthe; Jean-Marie Blondel, Villers Les Nancy, all of France

[73] Assignee: Solvay (Société Anonyme), Brussels, Belgium

[21] Appl. No.: 972,783

[22] Filed: Nov. 9, 1992

[30] Foreign Application Priority Data

Nov. 8, 1991 [FR] France .................. 91 13974

[51] Int. Cl.$^5$ .......................... C01D 9/06; C01D 5/06
[52] U.S. Cl. .................. 423/239.1; 423/244.08
[58] Field of Search .............. 423/239, 239 A, 244.08, 423/239.1

[56] References Cited

U.S. PATENT DOCUMENTS

| | | | |
|---|---|---|---|
| 4,105,744 | 8/1978 | Erdoess et al. | 423/239 |
| 4,454,099 | 6/1984 | Moffat | 423/239 |
| 4,588,569 | 5/1986 | Cyran et al. | 423/244 |
| 4,663,136 | 5/1987 | Furlong | 423/239 |
| 4,767,605 | 8/1988 | Lindbauer et al. | 423/239 |
| 4,795,619 | 1/1989 | Lerner | 423/244 |

FOREIGN PATENT DOCUMENTS

| | | |
|---|---|---|
| 0343673 | 11/1989 | European Pat. Off. |
| 2274338 | 1/1976 | France |
| 8605714 | 10/1986 | PCT Int'l Appl. |
| 1466218 | 3/1977 | United Kingdom |

*Primary Examiner*—Gary P. Straub
*Attorney, Agent, or Firm*—Spencer, Frank & Schneider

[57] ABSTRACT

Process for purifying a gas containing nitric oxide, in which a gas containing oxygen and sulphur dioxide is used and the gas is treated with sodium carbonate hydrate at a temperature of between 320 and 500K.

16 Claims, 6 Drawing Sheets

PROCESS FOR PURIFYING A GAS CONTAINING NITRIC OXIDE

The invention relates to the purification of gases to remove toxic impurities, especially the purification of fumes from thermal plants before they are discharged to the atmosphere.

It relates more particularly to a process for purifying a gas to remove nitrogen oxides and more especially to remove nitric oxide (NO).

The fumes generated by the burning of gaseous, liquid or solid fuels are usually contaminated by nitrogen oxides originating from the nitrogen in the atmospheric air and, where applicable, from the nitrogen compounds present in the fuel. Most of the nitrogen oxides in these fumes is nitric oxide (NO), the remainder consisting chiefly of nitrogen peroxide ($NO_2$).

The high toxicity of nitric oxide and of nitrogen peroxide involves removing them from the fumes before the latter are discharged into the atmosphere.

European Patent Application EP-A-343,673 (Ceskoslovenska Akademie) describes a process for purifying a wet gas to remove nitrogen oxides, according to which the gas, at a temperature of 130° C., is circulated through a fluidised bed of extralight sodium carbonate hydrate (Example 13). The extralight sodium carbonate is obtained by subjecting sodium carbonate hydrate containing more than 7 molecules of water to a number of successive sequences of thermal decompositions and drying operations.

This known process involves the use of extralight sodium carbonate hydrate which is difficult to obtain. It can be applied only to the purification of wet gases whose temperature is raised.

The invention overcomes these disadvantages of the known process described above by providing a new process which makes it possible to carry out an efficient purification of a gas to remove nitric oxide by means of a reactant which is easy to obtain and which requires neither the presence of moisture in the gas, nor an elevated working temperature.

Consequently, the invention relates to a process for purifying a gas to remove nitric oxide, according to which the gas is treated with an alkali metal compound comprising sodium carbonate hydrate; according to the invention, oxygen and sulphur dioxide are used in the gas and the temperature of the gas is controlled between 320 and 500K.

The invention applies to all gases containing nitric oxide (NO). It applies especially to the gases generated by the burning of fuels in the presence of air or oxygen. As a result, a gas originating from the burning of a fuel will be called "fume". In the case where the invention is applied to a fume, the fuel is not critical and may be equally well a gas, a liquid or a solid. It may comprise a fuel of fossil origin (such as oil and its derivatives, coal and coke), biomass or flammable organic or inorganic substances originating, for example, from household, industrial or municipal waste. The source of the fume is not critical either, it being possible for the latter, for example, to originate from a power station for producing electricity, an urban centralised heating plant or an incineration plant for household or municipal refuse.

The gas treated in the process according to the invention necessarily contains nitric oxide (NO). It may contain other nitrogen oxides in addition to nitric oxide, for example nitrous oxide ($N_2O$), nitrogen trioxide ($N_2O_3$), nitrogen pentoxide and nitrogen peroxide ($NO_2$). In what follows, the nitrogen oxides in the gas will be referred to as a group by the notation $NO_x$. As a general rule, the volume fraction of nitric oxide (NO) among all the nitrogen oxides ($NO_x$) of the gas is at least 50% and generally higher than 75% of the total quantity of nitrogen oxides; it can be 100%.

In accordance with the invention, an alkali metal compound comprising sodium carbonate hydrate is used to purify the gas. The expression "sodium carbonate hydrate" is intended to denote the sodium carbonate hydrates containing 1, 7 or 10 molecules of water and mixtures of these hydrates with each other or with anhydrous sodium carbonate. These hydrates and their mixtures consequently correspond to the theoretical formula $Na_2CO_3.nH_2O$ where n denotes a whole or fractional number greater than 0 and not exceeding 10. In what follows, the formula $Na_2CO_3.nH_2O$ is employed to denote a sodium carbonate hydrate, a mixture of sodium carbonate hydrates or a mixture of at least one sodium carbonate hydrate with anhydrous sodium carbonate. In accordance with the invention the alkali metal compound comprises sodium carbonate hydrate of formula $Na_2CO_3.nH_2O$ where n varies from 0.5 to 10 and is preferably greater than 0.7.

In the process according to the invention it is desirable that the alkali metal compound should comprise at least 50% by weight of sodium carbonate hydrate, contents higher than 80% being preferred and those of at least 90% being especially recommended. Alkali metal compounds which have been found advantageous are those comprising between 95 and 100% by weight of sodium carbonate hydrate, those comprising between 98 and 100% by weight of sodium carbonate hydrate being preferred. In addition to sodium carbonate hydrate, the alkali metal compound may optionally comprise alkali metal bicarbonate, preferably sodium bicarbonate, for example in a quantity of between 0.5 and 2% by weight.

In a preferred embodiment of the process according to the invention sodium carbonate hydrate of formula $Na_2CO_3.nH_2O$ in which n varies from 0.8 to 1.2 is selected, for example sodium carbonate monohydrate.

In this preferred embodiment of the process according to the invention, use is advantageously made of the sodium carbonate hydrate obtained by means of an operating procedure comprising an impregnation of anhydrous sodium carbonate with water and a drying of the product resulting from the impregnation at a temperature above the transition temperature of sodium carbonate heptahydrate to sodium carbonate monohydrate and lower than the boiling temperature of water. The sodium carbonate employed in this operating procedure may comprise dense soda, light soda or a mixture of dense soda and light soda. Light soda, of apparent density substantially between 550 and 650 kg/$m^3$ is preferred. In the operating procedure just described the anhydrous sodium carbonate is used in the form of a powder. The latter advantageously consists of particles whose diameter does not exceed 200 $\mu$m and is preferably smaller than 100 $\mu$m, for example between 5 and 50 $\mu$m. The quantity of water used in the stage of impregnation of the anhydrous sodium carbonate must be at least equal to the theoretical quantity needed to form sodium carbonate monohydrate by hydration of anhydrous sodium carbonate. In general, it is recommended to use a quantity of water which is greater than the abovementioned theoretical quantity. It is preferred to use a volume quantity of water greater than 0.08 and preferably at least 0.1 times the voluble quantity of anhydrous sodium carbonate. Although the invention does not impose any upper limit on the quantity of water employed, there is no advantage in exaggerating the excess of water, in order not to overburden the cost and the duration of the subsequent drying. In general there is no advantage in employing a volume quantity of water greater than 5 times the volume quantity of anhydrous sodium carbonate used. The volume quantities of water of between 0.1 and 2 times the volume quantity of anhydrous sodium carbonate are especially recommended, those between 0.3 and 1.5 being preferred. An aging period must be provided between the beginning of the impregnation and the drying. The purpose of this aging period is to allow all the anhydrous sodium carbonate to be impregnated with the impregnating water and consequently depends on the particle size of the anhydrous sodium carbonate powder. It can vary from a few minutes (for example between 5 and 20 minutes) to a number of hours (for example between 15 and 30 hours). The drying must be performed at a temperature above the temperature of transition of sodium carbonate heptahydrate to sodium carbonate monohydrate. Its purpose is to form sodium carbonate monohydrate and to remove the moisture which impregnates it. A drying temperature not exceeding 60° C. is advantageously chosen, temperatures of between 38 and 50° C. being suitable. The drying time depends on the quantity of water used in the impregnation stage and on the drying temperature.

The sodium carbonate hydrate obtained by the operating process just described generally exhibits an apparent density lower than 1200 kg/m$^3$, usually between 500 and 1000 kg/m$^3$.

According to the invention, oxygen and sulphur dioxide are used in the gas to be purified. The quantities of oxygen and of sulphur dioxide to be used depend on the concentration of nitrogen oxides NO$_x$ in the gas, in particular of nitric oxide NO, as well as on the required degree of purification to remove nitric oxide. In general it is recommended to produce, in the gas to be purified, an O$_2$/NO molar ratio higher than 2.5, preferably at least equal to 7 and an SO$_2$/NO molar ratio higher than 0.1, preferably at least equal to 0.2. There is no advantage in producing O$_2$/NO and SO$_2$/NO molar ratios which exceed 100 and 10 respectively. O$_2$/NO molar ratios of an least 15, for example between 40 and 60, and SO$_2$/NO molar ratio of at least 0.3, for example between 1 and 2, are especially advantageous.

The temperature in the process according to the invention is critical and must lie between 320 and 500K. Recommended temperatures lie between 325 and 450K. Temperatures lying between 335 and 430K are especially advantageous, those lying between 340 and 400K being preferred.

In the process according to the invention the sodium carbonate hydrate must be used in a sufficient quantity to decompose the sulphur dioxide and the nitric oxide by forming sodium sulphate (and possibly sulphite) and sodium nitrite and nitrate. In fact, the existence of a synergy has been observed in the decomposition of sulphur dioxide and of nitric oxide by sodium carbonate hydrate. As a result, the quantity of sodium carbonate hydrate to be used depends on the respective concentrations of sulphur dioxide and of nitric oxide in the gas and must be determined in each individual case, for example by routine laboratory work.

The treatment of the gas with the sodium carbonate hydrate in the process of the invention is performed by a dry route. For this purpose the sodium carbonate hydrate is used in the solid state in the gas, in the absence of a liquid, in particular of water, with the exception of the water of hydration of the sodium carbonate hydrate. Various operating methods can be employed. According to a first operating method the sodium carbonate hydrate is injected in powder form into the gas, inside a reaction chamber. According to a second operating method the gas is circulated in a stationary bed, a mobile bed or a fluidised bed of sodium carbonate hydrate particles. These operating methods are well-known in chemical engineering techniques. In these it is advantageous to employ a powder of a particle size which is uniform and as fine as possible, so as to accelerate the reaction of sodium carbonate hydrate with the sulphur dioxide and the nitrogen oxides in the gas. As a general rule it is recommended to employ a powder whose particle diameter is smaller than 100 µm. The preferred particle size corresponds to a particle diameter not exceeding 50 µm, for example between 5 and 15 µm.

The process according to the invention results in the formation of a solid residue comprising sodium sulphate and possibly sodium sulphite, sodium nitrite and sodium nitrate. This residue can be removed easily from the gas by treating the latter with a suitable dust removal device which may, for example, comprise an electrostatic filter or, preferably, a filter with filter fabrics (bag filter), which is the most efficient.

The process according to the invention applies to the purification of any gas containing nitrogen oxides NO$_x$. Examples of application include the purification of the fumes originating from the incineration of household or municipal refuse, the purification of fumes originating from the burning of biomasses and the purification of fumes originating from the burning of sulphur-containing fuels of fossil origin, such as natural gas, carbon and oil derivatives. It applies in particular to the purification of the fumes originating from power stations producing electricity.

The following examples are used to illustrate the invention. They are detailed with reference to FIGS. 1 to 6 of the attached drawings.

First Series of Tests

Examples 1, 2, 3 and 4, which follow, deal with the preparation of sodium carbonate hydrate according to the operating procedure in accordance with the inventions described above.

Example 1

100 cm$^3$ of anhydrous sodium carbonate of the light soda type were introduced into an oven maintained at room temperature, followed by 40 ml of water. After a few minutes aging, a homogeneous paste was obtained. The temperature in the oven was then controlled between 40° and 42° C. and this temperature was maintained for five days to dry the product. At the end of the drying a powder was obtained which had the following composition:

$Na_2CO_3$: 836 g/kg,
$NaHCO_3$: 16 g/kg,
$H_2O$ : 148 g/kg.

In this product the water is present in the form of water of hydration of sodium carbonate, with the result that virtually all of the latter is sodium carbonate monohydrate.

Example 2

The test of Example 1 was repeated using 100 cm³ of anhydrous sodium carbonate and 50 ml of water in the oven. The drying operation, performed at a temperature lying between 40° and 42° C., lasted 6 days. At the end of the drying a powder was obtained which had the following composition:
$Na_2CO_3$: 846 g/kg,
$NaHCO_3$: 0 g/kg,
$H_2O$: 154 g/kg.

In this product virtually all of the water is the water of hydration of sodium carbonate, with the result that the latter is virtually completely in the form of sodium carbonate monohydrate. An apparent density of 890 kg/m³ was measured on the powder.

Example 3

The test of Example 1 was repeated using 100 cm³ of anhydrous sodium carbonate and 65 ml of water in the oven. The drying operation, performed at a temperature lying between 40° and 42° C., lasted 6 days. At the end of the drying a powder was obtained which had the following composition:
$Na_2CO_3$: 830 g/kg,
$NaHCO_3$: 12 g/kg,
$H_2O$: 158 g/kg.

In this product virtually all of the water is present in the forth of water of hydration of sodium carbonate, with the result that approximately all of the latter is sodium carbonate monohydrate.

Example 4

Figure 1:
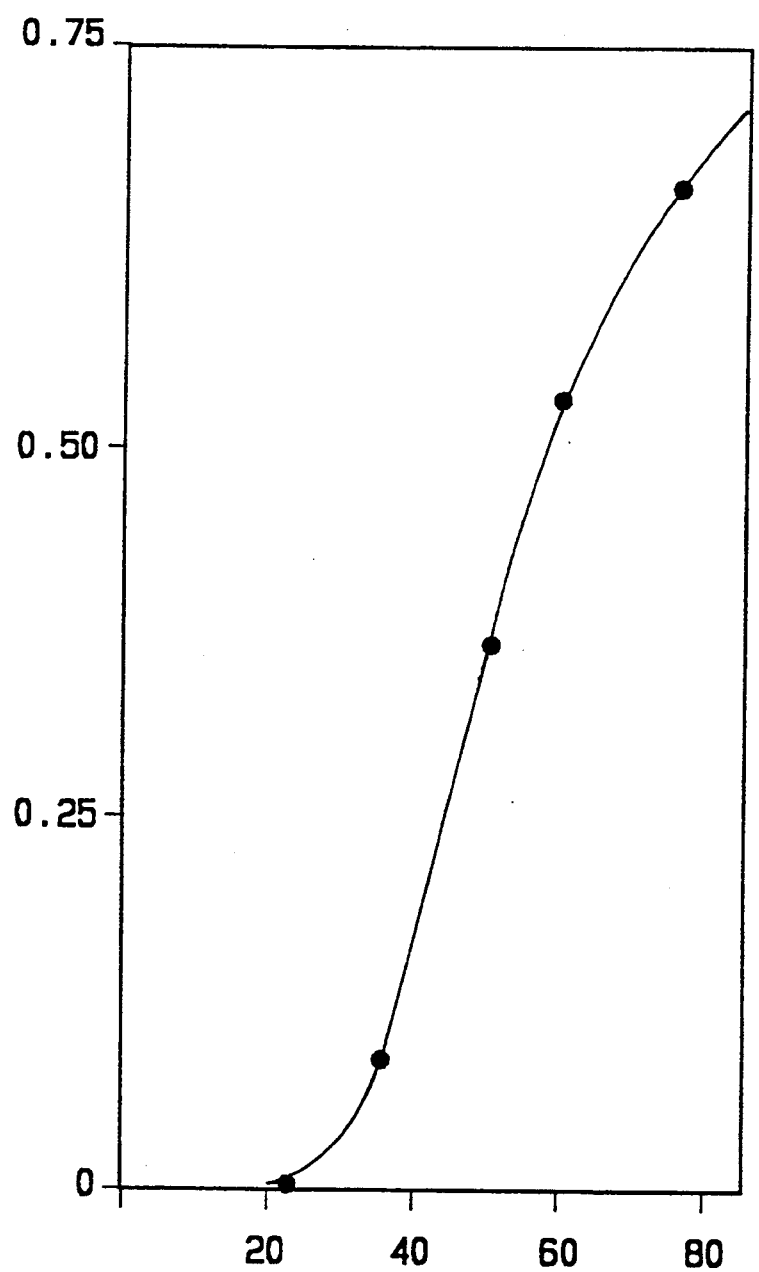
FIG. 1 is a diagram showing the cumulative particle size distribution of an anhydrous sodium carbonate powder.

Anhydrous sodium carbonate and distilled water, in a water/$Na_2CO_3$ mass ratio substantially equal to 0.485 were introduced into an oven maintained at room temperature. The sodium carbonate was used in the form of a powder whose particle size distribution is shown in the diagram of FIG. 1, in which the abscissa axis represents the diameter of the particles (in $\mu$m) and the ordinate axis expresses the cumulative weight particle size fractions. The abovementioned weight ratio corresponds to a water/$Na_2CO_3$ volume ratio of 1.217. After an aging period of approximately 10 minutes the temperature in the oven was controlled at approximately 45° C. and this temperature was maintained for approximately 24 hours, so as to obtain a crumbly product. The latter was found to consist virtually entirely of sodium carbonate monohydrate.

Second Series of Tests

Examples 5, 6, 7, 8 and 9, which follow, are accordance with the invention and deal with the treatment of a gas containing nitric oxide with the sodium carbonate hydrate obtained in accordance with Example 4.

Example 5

A synthetic gas was prepared, consisting essentially of argon, nitric oxide, sulphur dioxide and oxygen, which had the following volume composition:
NO: 413 $\mu$l/l of gas,
$SO_2$: 150 $\mu$l/l of gas,
$O_2$: 22,980 $\mu$l/l of gas.

Furthermore, a bed of 6 g of a product in accordance with that obtained in Example 4 (comprising more than 98% by weight of sodium carbonate monohydrate) was prepared, resting on a horizontal grid. Particles exhibiting a mean diameter of approximately 10 $\mu$m were employed in the bed.

The gas was subjected to a uniform upward movement through the bed at a speed controlled so as to fluidise it.

Figure 2:
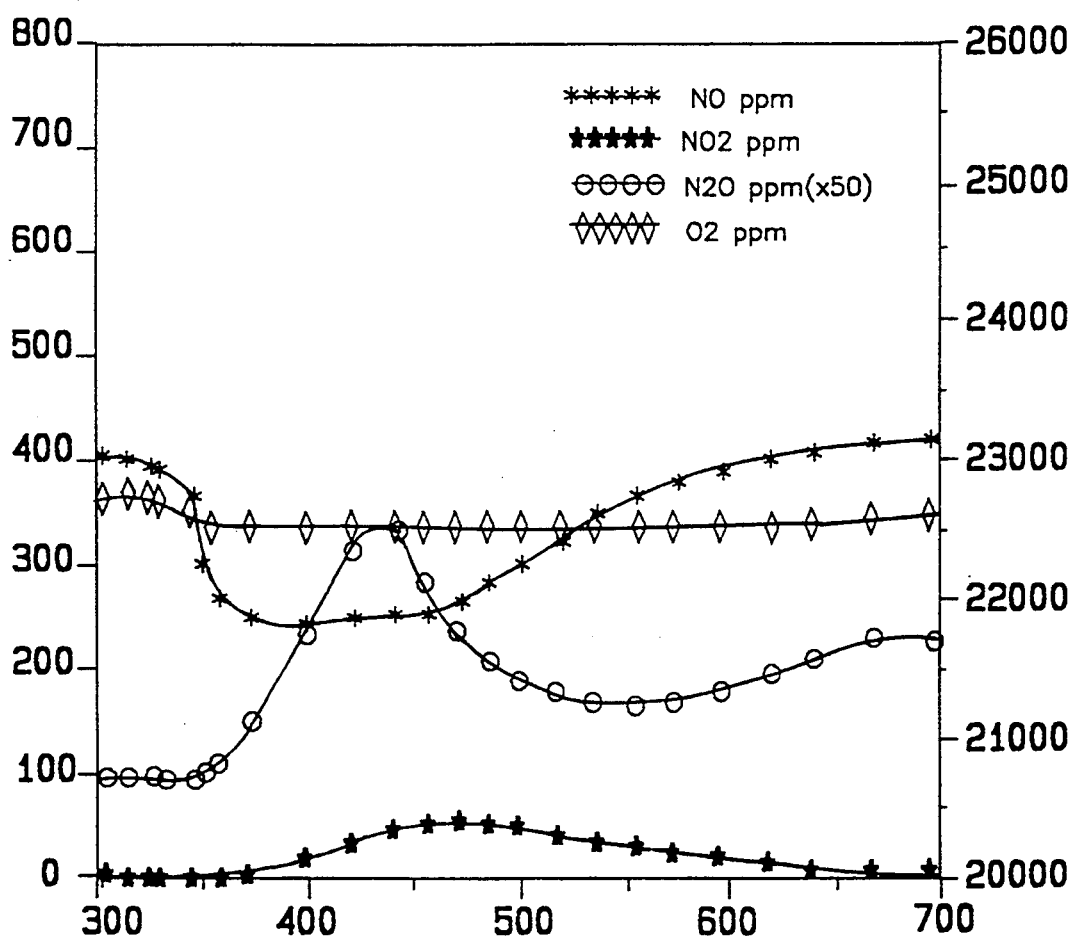
FIGS. 2 to 6 are five diagrams giving the gas composition containing nitrogen oxides NO$_x$.

During the test the temperature of the gas in the bed was gradually raised to 700K and the composition of the gas was recorded between 300K and 700K. The results of the test are plotted on the diagram of FIG. 2. In this diagram the abscissa scale denotes the temperature of the gas at the entry of the bed (expressed in degrees Kelvin), the ordinate scale on the left shows the volume concentration of each of the constituents NO, $NO_2$ and $N_2O$ of the gas at the exit of the bed (these concentrations being expressed in ppm or $\mu$l of the constituent/l of gas, and having to be divided by 50 in the case of $N_2O$), and the ordinate scale on the right denotes the volume concentration of oxygen in the gas at the exit of the bed (expressed in ppm or $\mu$l of oxygen per l of gas). It is seen that the gas has undergone an optimum purification from nitrogen oxide at temperatures lying between approximately 360 and 480K. At a temperature of approximately 385K the purified gas contains a minimum content of nitrogen oxides $NO_2$.

Example 6

The test of Example 5 was repeated with a synthetic gas exhibiting the following volume composition:
NO: 414 $\mu$l/l,
$SO_2$: 675 $\mu$l/l,
$O_2$: 22,450 $\mu$l/l.

Figure 3:
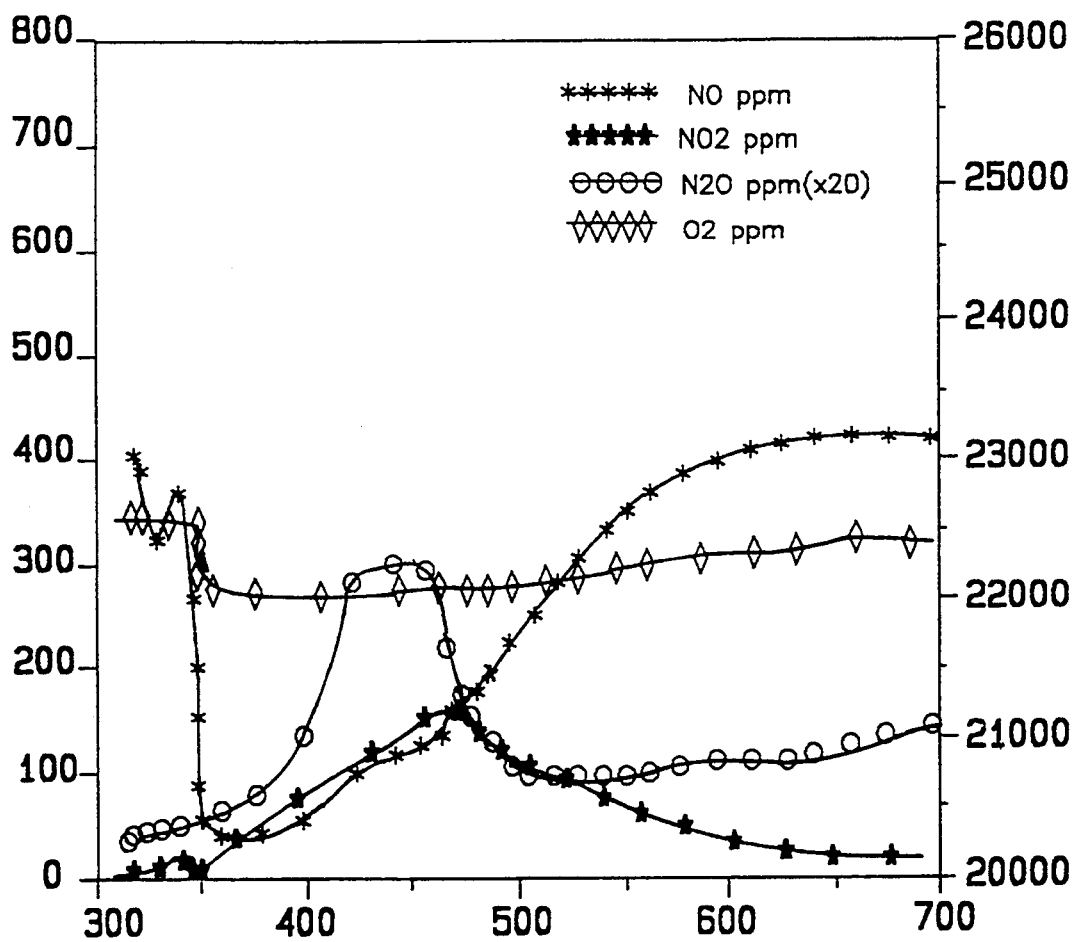

The procedure was as in Example 5. The results of the test are reproduced on the diagram of FIG. 3, in which the abscissa and ordinate scales have the same definition as in FIG. 2 (the concentrations of the ordinate scale on the left, however, having to be divided by 20 in the case of $N_2O$).

It is noted that the gas has undergone an optimum purification to remove nitric oxide at the temperatures lying between approximately 345 and 410K. The purification to remove nitrogen oxides $NO_x$ is optimum at a temperature of approximately 350K, the gas at the exit of the bed then exhibiting the following composition:
NO: 43 $\mu$l/l;
$NO_2$: 43 $\mu$l/l;
$N_2O$: 3 $\mu$l/l;
$O_2$: 22,000 $\mu$l/l.

Example 7

The test of Example 5 was repeated with a synthetic gas exhibiting the following volume composition:
NO: 418 $\mu$l/l,
$SO_2$: 675 $\mu$l/l,
$O_2$: 3220 $\mu$l/l.

Figure 4:
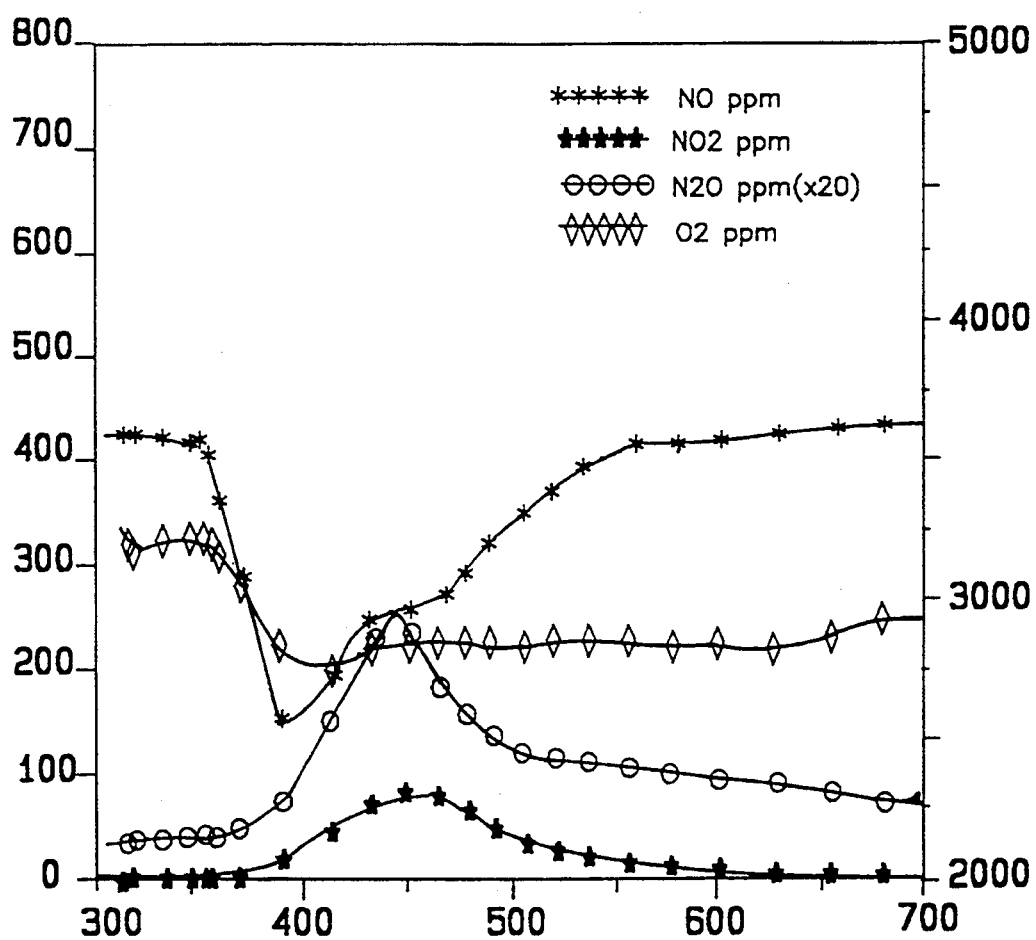

The procedure was as in Example 5. The results of the test are reproduced on the diagram of FIG. 4, in which the abscissa and ordinate scales have the same definition as in FIG. 2 (the concentrations of the ordinate scale on the left, however, having to be divided by 20 in the case of $N_2O$).

It is noted that the gas has undergone an optimum purification to remove nitric oxide at the temperatures lying between approximately 375 and 425K. The purification to remove nitrogen oxides $NO_x$ is optimum at a temperature of approximately 385K, the gas at the exit of the bed then exhibiting the following composition:
NO: 165 μl/l;
$NO_2$: 0 μl/l;
$N_2O$: 3 μl/l;
$O_2$: 2900 μl/l.

Example 8

The test of Example 5 was repeated with a synthetic gas exhibiting the following volume composition:
NO: 417 μl/l,
$SO_2$: 675 μl/l,
$O_2$: 1170 μl/l.

Figure 5:
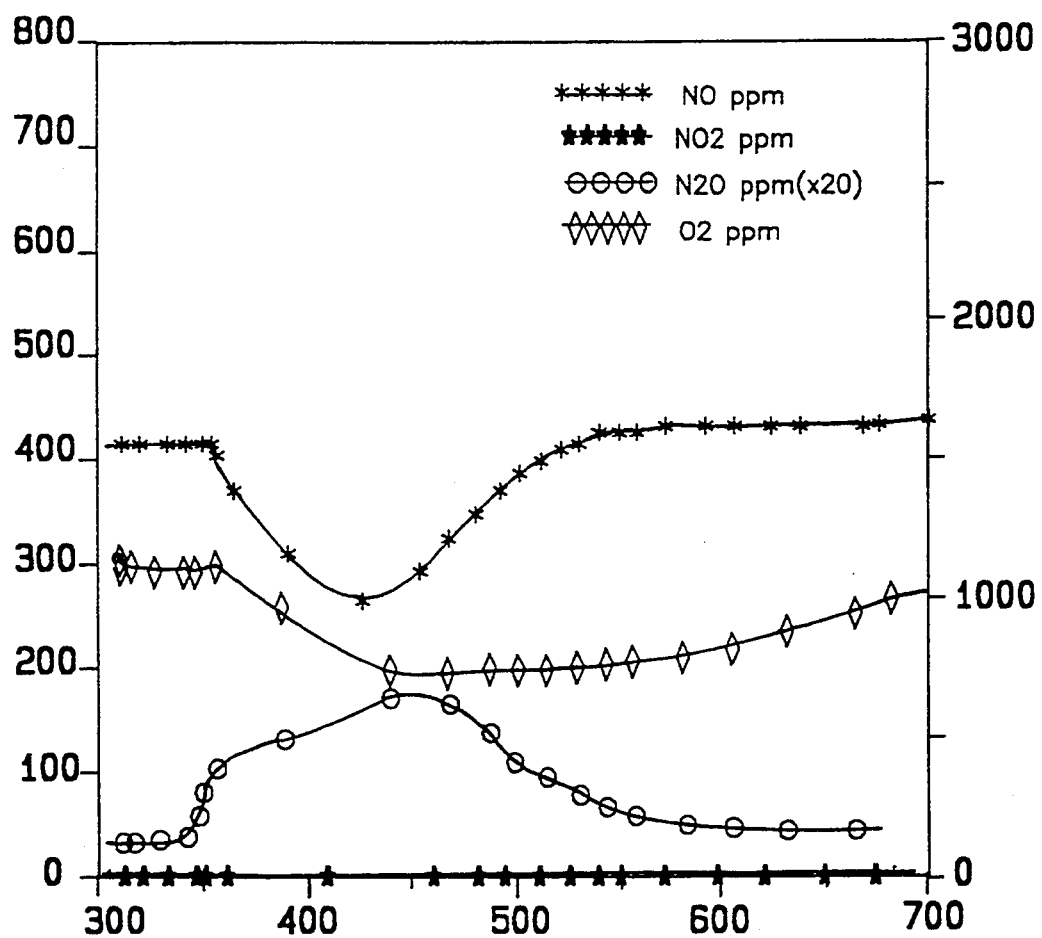

The procedure was as in Example 5. The results of the test are reproduced on the diagram of FIG. 5, in which the abscissa and ordinate scales have the same definition as in FIG. 2 (the concentrations of the ordinate scale on the left, however, having to be divided by 20 in the case of $N_2O$).

It is noted that the gas has undergone an optimum purification to remove nitric oxide at the temperatures lying between approximately 400 and 450K. The purification to remove nitrogen oxides $NO_x$ is optimum at a temperature of approximately 425K.

Example 9

The test of Example 5 was repeated with a synthetic gas exhibiting the following volume composition:
NO: 412 μl/l,
$SO_2$: 35 μl/l,
$O_2$: 22,930 μl/l.

Figure 6:
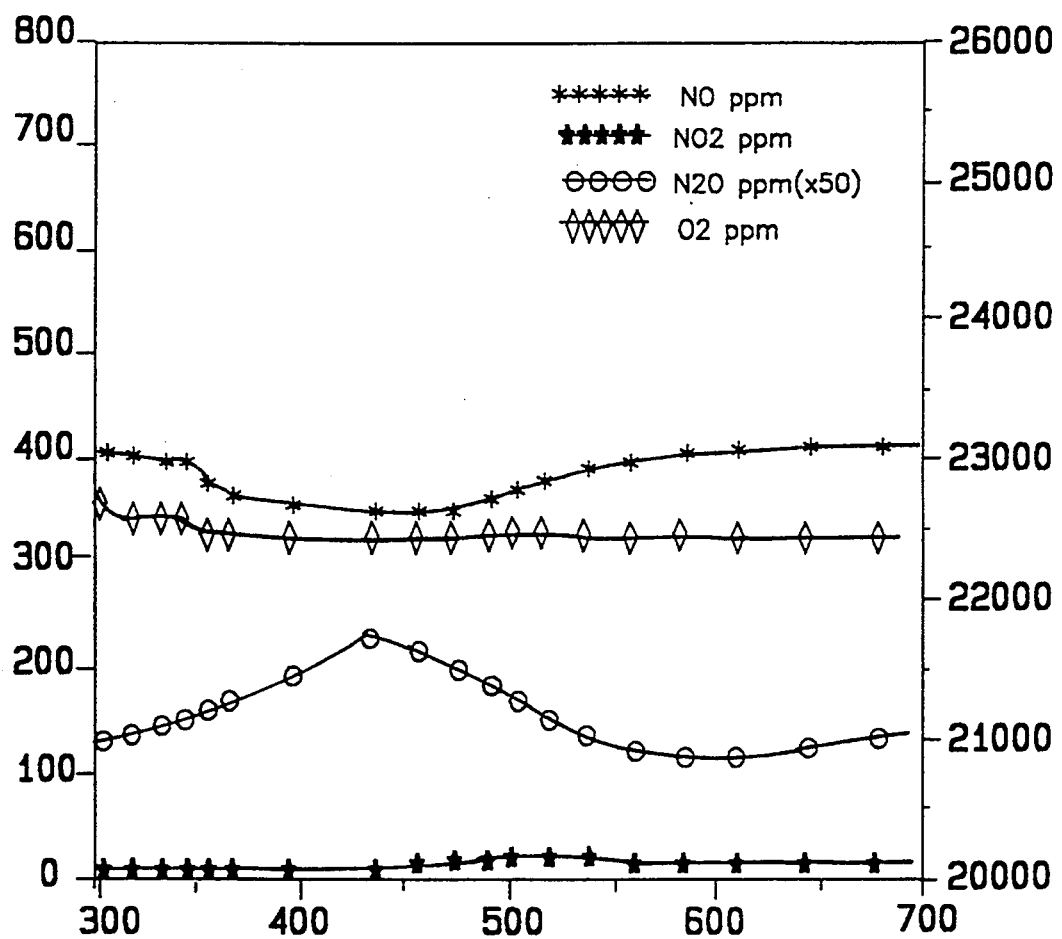

The procedure was as in Example 5. The results of the test are reproduced on the diagram of FIG. 6, in which the abscissa and ordinate scales have the same definition as in FIG. 2 (the concentrations of the ordinate scale on the left having to be divided by 50 in the case of $N_2O$).

It is seen that the purification of the gas to remove nitrogen oxides is negligible. This low purification efficiency is attributable to an excessively small concentration of sulphur dioxide in the gas subjected to the purification.

A comparative examination of the results of Examples 5 to 9 immediately shows that the efficiency of the purification to remove nitrogen oxides $NO_x$ (especially from nitric oxide NO) is critically affected by the temperature and the sulphur dioxide and oxygen contents of the gas.

I claim:

1. A process for purifying a gas to remove nitric oxide, comprising:
adjusting an oxygen and sulphur dioxide content of a gas containing nitric oxide to provide the following molar ratios relative to nitric oxide:
$O_2$/NO greater than 2.5;
$SO_2$/NO greater than 0.1;
contacting said gas containing nitric oxide, oxygen and sulphur dioxide with an alkali metal compound comprising sodium carbonate hydrate of the formula $Na_2CO_3.nH_2O$ where $0.5 < n < 10$ at a temperature of the gas controlled between about 320 and 500 K; and
removing nitric oxide and sulphur dioxide from said gas by forming sodium nitrite, sodium nitrate, and sodium sulphate.

2. The process according to claim 1, wherein the alkali metal compound contains at least 95% by weight of sodium carbonate hydrate.

3. The process according to claim 2, wherein the sodium carbonate hydrate is chosen from sodium carbonate hydrates, mixtures of sodium carbonate hydrates and mixtures of at least one sodium carbonate hydrate with anhydrous sodium carbonate, and corresponds to the theoretical formula $Na_2CO_3.nH_2O$ in which n denotes a whole or fractional number between 0.8 and 1.2.

4. The process according to claim 3, wherein the sodium carbonate hydrate comprises sodium carbonate monohydrate.

5. The process according to claim 1, wherein an alkali metal compound is used, obtained by impregnation of anhydrous sodium carbonate with water and drying of the product resulting from the impregnation at a temperature above the temperature of transition of sodium carbonate heptahydrate into sodium carbonate monohydrate.

6. The process according to claim 5, wherein the drying is performed at a temperature between 38° and 45° C.

7. The process according to claim 5, wherein a quantity by volume of water of between 0.3 and 1.5 times the quantity of volume of sodium carbonate is used for the impregnation of the anhydrous sodium carbonate.

8. The process according to claim 5, wherein the anhydrous sodium carbonate subjected to the impregnation is light soda.

9. The process according to claim 1, wherein an $O_2$/NO molar ratio of between 40 and 60 and an $SO_2$/NO molar ratio of between 1.5 and 2 are used.

10. The process according to claim 1, wherein treatment of the gas with the alkali metal compound is performed by a dry route.

11. The process according to claim 1, wherein said nitric oxide containing gas is produced by the burning of a sulphur-containing fuel of fossil origin, from the incineration of domestic or municipal refuse or from the combustion of biomasses.

12. The process according to claim 1, wherein said gas containing nitric oxide initially also contains sulphur dioxide.

13. The process according to claim 12, wherein said gas initially also contains oxygen.

14. A process for purifying a gas to remove nitrogen oxides, comprising:
adjusting an oxygen and sulphur dioxide content of a gas containing nitrogen oxides of the formula $NO_x$, provided that at least half of $NO_x$ is NO, to provide the following molar ratios relative to nitric oxide:
$O_2$/NO greater than 2.5;
$SO_2$/NO greater than 0.1;
contacting said gas containing nitrogen oxides, oxygen, and sulphur dioxide, with an alkali metal compound comprising sodium carbonate hydrate of the formula $Na_2CO_3.nH_2O$ where $0.5 < n < 10$ at a temperature of the gas controlled between about 320 and 500K; and
removing nitrogen oxides and sulphur dioxide from said gas by forming sodium nitrite, sodium nitrate, and sodium sulphate.

15. The process according to claim 12, wherein said gas initially containing nitrogen oxides also contains sulphur dioxide.

16. The process according to claim 15, wherein said gas initially also contains oxygen.

* * * * *